(12) United States Patent
Nakamura et al.

(10) Patent No.: US 7,475,748 B2
(45) Date of Patent: Jan. 13, 2009

(54) REAR STRUCTURE OF ALL TERRAIN VEHICLE

(75) Inventors: Eiichi Nakamura, Hamamatsu (JP); Takuya Kusaka, Hamamatsu (JP); Tetsuharu Nojiri, Hamamatsu (JP)

(73) Assignee: Suzuki Kabushiki Kaisha, Hamamatsu-shi (JP)

( * ) Notice: Subject to any disclaimer, the term of this patent is extended or adjusted under 35 U.S.C. 154(b) by 567 days.

(21) Appl. No.: 11/180,621

(22) Filed: Jul. 14, 2005

(65) Prior Publication Data
US 2006/0011401 A1 Jan. 19, 2006

(30) Foreign Application Priority Data
Jul. 15, 2004 (JP) ............................ P2004-208647

(51) Int. Cl.
*B60K 11/06* (2006.01)
(52) U.S. Cl. .................................... 180/68.1; 180/68.2
(58) Field of Classification Search ................ 180/68.1, 180/68.2, 309, 89.2
See application file for complete search history.

(56) References Cited

U.S. PATENT DOCUMENTS

| 4,306,740 | A | * | 12/1981 | Kleykamp et al. ............ 285/39 |
| 5,976,044 | A | * | 11/1999 | Kuyama ...................... 474/93 |
| 6,705,417 | B2 | * | 3/2004 | Kitai et al. ................. 180/68.1 |
| 6,820,708 | B2 | * | 11/2004 | Nakamura ................. 180/68.2 |
| 6,823,956 | B2 | * | 11/2004 | Shimizu .................... 180/68.1 |
| 6,938,676 | B2 | * | 9/2005 | Lan et al. ...................... 165/41 |
| 2003/0066696 | A1 | * | 4/2003 | Nakamura ................. 180/68.1 |

* cited by examiner

*Primary Examiner*—Christopher Ellis
*Assistant Examiner*—Joseph Rocca
(74) *Attorney, Agent, or Firm*—Oblon, Spivak, McClelland, Maier & Neustadt, P.C.

(57) ABSTRACT

An all terrain vehicle has a rear structure in which a exhaust duct extends rearward from a rear portion of a belt transmission and is detachably supported by a vehicle body frame, the exhaust duct is composed of a plurality of constituent members coupled to one another along an exhaust direction of the exhaust air flowing in the exhaust duct, the constituent members having a distance from one another are formed from a high rigidity material maintaining its own shape thereof, and the constituent members are detachably coupled to one another through a coupling member formed of an elastic material.

8 Claims, 6 Drawing Sheets

REAR STRUCTURE OF ALL TERRAIN VEHICLE

BACKGROUND OF THE INVENTION

1. Field of the Invention

The present invention relates to a rear structure of an all terrain vehicle (ATV).

2. The Related Art

An engine unit, in which a belt (belt-type) continuously variable transmission (CVT) is formed integrally with an engine main body and which is mounted in a saddle type all terrain vehicle (ATV), a motor-cycle or the like, includes a vehicle transmission cooling structure.

The vehicle transmission cooling structure introduces, as cooling air, fresh air from an outside (external air) into, for example, a belt case in which the transmission is accommodated through, for example, a duct to cool members arranged in the belt case, and discharges the cooling air into the atmospheric air through, for example, a duct so as to prevent heat generated by the operation of the transmission from adversely influencing a V-belt, a seal member, etc.

A rigid exhaust dust formed of, for example, synthetic resin, is conventionally attached to an exhaust port provided in a rear portion of the belt case through an elastic body such as rubber, and fixed to a vehicle body frame. In addition, a cooling air exhaust port of the exhaust duct is set at a position higher than that of an exhaust port of an exhaust muffler so that water does not enter the belt case while the vehicle moves at the waterside or in a rainy day (see, for example, Japanese Patent Laid-Open (JP-A) Publication Nos. 2003-90417 and 2003-56679).

A rear wheel driving system such as a rear wheel final reduction gear or a rear wheel differential reduction gear includes a breather device, and a breather hose for discharging a blow-by gas. The breather hose is arranged from the rear wheel driving system to an upper portion of a vehicle body at a depth equal to or larger than the depth of water at which the vehicle can move and then bent downward so as to prevent water or the like from entering the hose during an intake operation (see, for example, Japanese patent Laid-Open (JP-A) No. HEI 9-328088).

However, if the exhaust duct is arranged from the belt case to the position higher than the exhaust port of the exhaust muffler, the exhaust duct becomes large in size. If the vehicle has an independent rear wheel suspension system, a structure of a rear portion of the vehicle body frame will become complicated. As a result, it is difficult to assemble the large-sized exhaust duct into the vehicle body. For this reason, it is sometimes necessary to provide an opening for assembling the exhaust duct to a portion of the vehicle body frame or to make partially detachable the vehicle body frame.

Meanwhile, when the breather hose is arranged and fixed, the breather hose is fixed along a vehicle body component such as the vehicle body frame using another component such as a clamp and the like. This disadvantageously increases the number of assembling steps and the number of components, resulting in cost-up.

SUMMARY OF THE INVENTION

The present invention was conceived in view of the circumstances encountered in the prior art mentioned above, and an object of the present invention is to provide a rear structure of an all terrain vehicle (ATV) capable of improving the performance for assembling an exhaust duct of a vehicle transmission cooling structure into a vehicle body.

It is another object of the present invention to provide a rear structure of an ATV capable of reducing the number of assembling steps, the number of components and manufacturing cost.

These and other objects can be achieved according to the present invention by providing a rear structure of an all terrain vehicle, the all terrain vehicle including: a vehicle body; a vehicle body frame having left and right frame members connected integrally to each other; an engine unit including a belt transmission on one side thereof and mounted to a central lower portion of the vehicle body frame; an inlet duct for introducing a cooling air, the inlet duct forcibly freshening an air within a belt case in which the belt transmission is accommodated so as to cool the belt transmission; an exhaust duct for discharging an exhaust air which has cooled the belt transmission; and an exhaust muffler device disposed at a portion outward of one side of a rear portion of the vehicle body frame, wherein the exhaust duct extends rearward from a rear portion of the belt transmission and is detachably supported by the vehicle body frame, the exhaust duct is composed of a plurality of constituent members coupled to one another along an exhaust direction of the exhaust air flowing in the exhaust duct, the constituent members distanced from one another are formed from a high rigidity material holding an own shape thereof, and the constituent members are detachably coupled to one another through a coupling member formed of an elastic material.

In a preferred embodiment of the present invention of the above aspect, it may be desired that the frame members are coupled by a plurality of cross members which are arranged in parallel to one another, the constituent members are formed in a bent shape by intersecting one another in an axial direction of the exhaust duct, and the bent portion is closely disposed to the cross members so that the exhaust duct is arranged in a meandering manner among the adjacent cross members, and the exhaust duct is detachably engaged with and positioned relative to the cross members while maintaining an own shape of the exhaust duct.

It may be also desired that the belt transmission is arranged in a manner offset on one side of the vehicle in a width direction, the exhaust duct extending rearward from a rear portion of the belt transmission is arranged so as to extend to a same side as the belt transmission, a fuel tank is arranged in a manner offset on a side opposite to the belt transmission and the exhaust duct across a center line of the vehicle in a plan view, the exhaust duct is arranged in a space formed between an inside surface to a bottom portion of the fuel tank in the width direction of the vehicle body and the vehicle body frame provided so as to face the inside surface and the bottom portion thereof so as to be along the inside surface and the bottom portion, and the coupling member coupling the constituent members of the exhaust duct to one another is arranged with a distance from a portion along the inside surface and the bottom portion of the fuel tank.

Furthermore, the exhaust duct may be arranged in a space above a rear wheel driving system arranged on the center line of the vehicle body in a plan view, and the exhaust duct is arranged to be proximate to the respective constituent members of the vehicle body frame which form the space, in which the coupling member is arranged.

It may be further desired that the exhaust muffler device and the rear wheel driving system are arranged with a distance vertically from each other, and a coupled portion of the exhaust duct led out rear-upward from the rear portion of the belt transmission is arranged so as to face a space formed between the exhaust muffler device or the rear wheel driving system and a portion above rear wheels.

A guide plate including a guide hole may be formed integrally with the exhaust duct, and a breather hose extending from the rear wheel driving system may be inserted into the guide hole to thereby position the breather hose.

According to the rear structure of the all terrain vehicle of the characters mentioned above, the detachability of the exhaust duct from the vehicle body can be improved. The exhaust duct can be compactly accommodated in the space formed between the fuel tank or rear drive wheel driving system and the vehicle body frame. The number of components and the manufacturing cost can be reduced.

Furthermore, it is possible to effectively cool the surroundings of the exhaust muffler device and sufficiently secure the capacity of the fuel tank.

The nature and further characteristic features of the present invention will be made more clear from the following descriptions made with reference to the accompanying drawings.

DESCRIPTION OF THE PREFERRED EMBODIMENT

An embodiment of the present invention will be described hereinafter with reference to the drawings.

It is first to be noted that terms "upper", "lower", "right", "left" and the like terms are used herein with reference to the illustration of the drawings or in a usual state of the vehicle on a ground.

Figure 1:
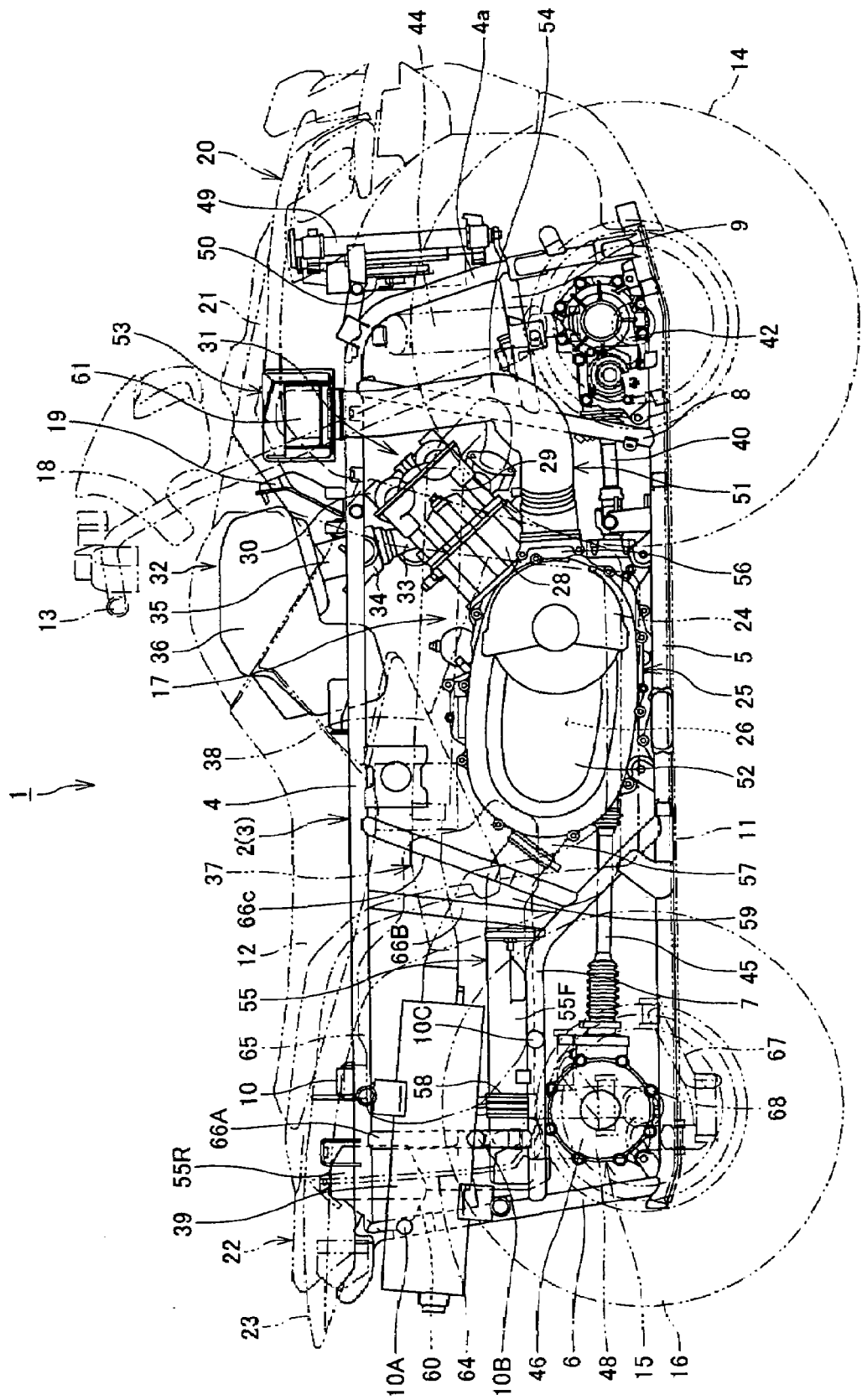
FIG. 1 is a right side perspective view of an all terrain vehicle (ATV) having a rear structure according to one embodiment of the present invention.
Figure 2:
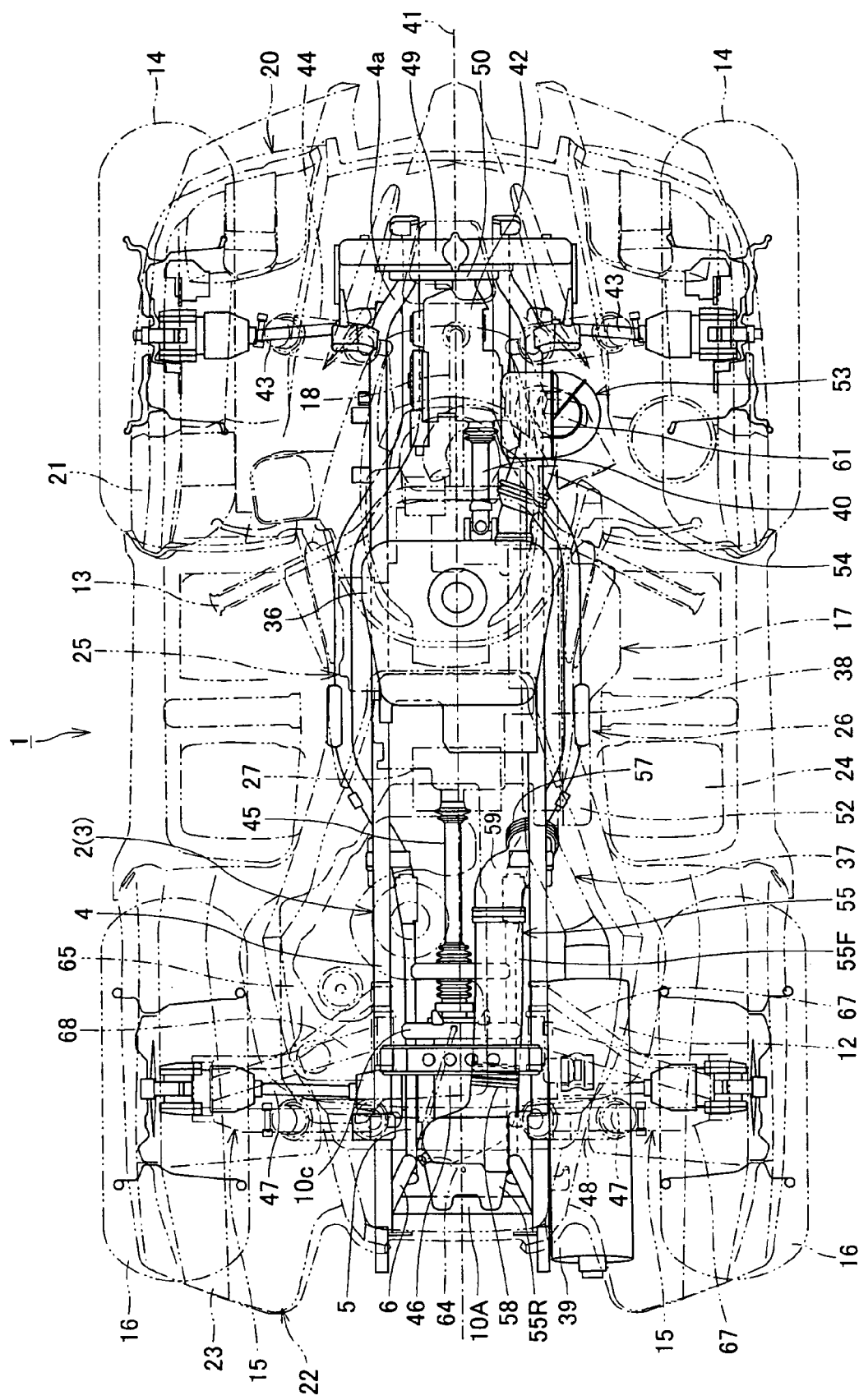
FIG. 2 is a perspective plan view of the ATV shown in FIG. 1.
Figure 3:
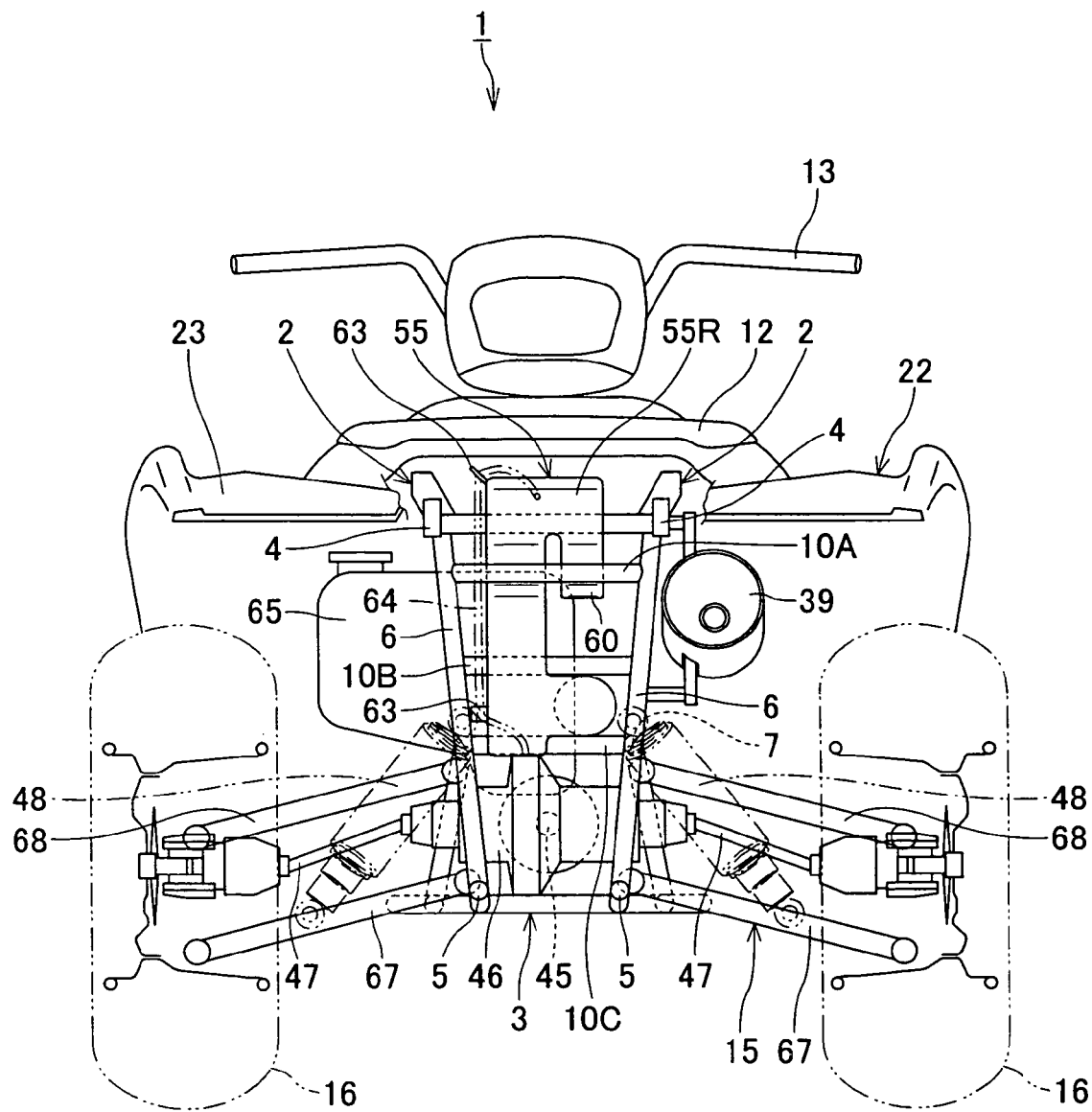
FIG. 3 is a rear view of the ATV shown in FIG. 1.

With reference to FIGS. 1 to 3, a saddle type all terrain vehicle (ATV) or vehicle body 1 includes a vehicle body frame 3 formed generally into a cage shape by coupling, for example, left and right integral steel frame members 2 in a width direction.

The frame members 2 include a pair of left and right upper frames 4 and a pair of left and right lower frames 5, respectively. A front portion of each upper frame 4 is bent generally downward to form a vertical frame portion 4a, and a tip end of the vertical frame portion 4a is connected to a tip end of the lower frame 5.

The frame members 2 also include: a pair of left and right rear vertical frames 6 connecting rear ends of the upper frames 4 to those of the lower frames 5 in a vertical direction, respectively; a pair of left and right rear transverse frames 7 connecting generally central portions of the rear vertical frames 6 to those of the lower frames 5 in a longitudinal direction, respectively; a pair of left and right front vertical frames 8 connecting the upper frames 4 to the lower frames 5 in front portions thereof in the vertical direction, respectively; a pair of left and right front transverse frames 9 connecting the front vertical frames 8 to the vertical frame portions 4a of the upper frames 4 in the longitudinal direction, respectively; and a plurality of cross members 10 connecting the left and right frame members 2 to each other.

A shape of the vehicle body frame 3 is generally a parallelogram almost close to a rectangular parallelepiped in a side view. The upper frames 4 arranged with a distance from each other in the width direction of the vehicle 1 are arranged substantially linearly in parallel to each other except for at their frontmost ends.

The lower frames 5 arranged with a distance from each other in the width direction have a meandering and bi-laterally symmetric shape so that a distance between front and rear portions of each lower frame 5 is smaller than that between front and rear portions of each upper frame 4 and so that a distance between intermediate portions of the lower frames 5 is larger than that between intermediate portions of the upper frames 4.

According to the structures or arrangements of the upper and lower frames 4 and 5 mentioned above, the vehicle body frame 3 is formed to have inverted trapezoidal front and rear portions and a trapezoidal intermediate portion in a front view. The trapezoidal intermediate portion is set to be larger in cross-sectional area than the inverted trapezoidal front and rear portions. Furthermore, an under guard 11 formed of, for example, a synthetic resin material, is disposed in a range from a front portion to a rear portion of a lower surface of each lower frame 5 constituting the vehicle body frame 3 so as to shield a lower portion of the vehicle body frame 3.

A saddle type rider's seat 12 is provided above and on the rear side of the upper frames 4 constituting the vehicle body frame 3, and a handle-bar 13 serving as a steering device of the vehicle 1 is provided in front of the rider's seat 12.

A pair of left and right front wheels 14 each having a wide low-pressure tire are provided in the front portion of the vehicle body frame 3 through a front suspension mechanism, which is not shown in detail.

A pair of left and right rear wheels 16 each having a wide low-pressure tire are provided in the rear portion of the vehicle body frame 3 through a rear suspension mechanism 15. Each upper frame 4 is arranged substantially horizontally so as to connect portions near upper ends of the corresponding front and rear wheels 14 and 16 to each other.

An engine unit 17 is mounted to a central lower portion of the vehicle body frame 3, i.e., at a portion between the front and rear wheels 14 and 16, below the upper frames 4, below the upper ends of the front and rear wheels 14 and 16, and on the rear side of the handle-bar 13. A steering shaft 18 is provided to extend from a base portion of the handle-bar 13 to each front wheel 14 located obliquely forward below the base portion thereof. A base portion of the steering shaft 18 is journaled by a transverse member, not shown, transversely extending between, for example, the left and right front transverse frames 9. A generally intermediate portion of the steering shaft 18 is journaled by a support bracket 19 provided so as to extend upward from each upper frame 4.

A front cover 20 serving as a vehicle body cover and covering a portion above the front portion of the vehicle body frame 3 is provided at the front portion of the vehicle body. A front fender 21 covering the left and right front wheels 14 is integrated with or formed integrally with the front cover 20.

A rear cover 22 serving as another vehicle body cover and covering a portion above the rear portion of the vehicle body frame 3 is provided at the rear portion of the vehicle body frame 3. A rear fender 23 covering the left and right rear wheels 16 is integrated with or formed integrally with the rear cover 22.

The front cover 20 and the rear cover 22 are connected to and integrated with each other in an intermediate portion of the vehicle (vehicle body) 1, and a step board 24 is formed between the front fender 21 and the rear fender 23. These vehicle body covers 20 to 24 are, for example, synthetic resin products, and a space is formed between the vehicle covers 20 to 24 and each upper frame 4.

The engine unit 17 has a structure such that an engine main body 25 is formed integrally with a belt (belt-type) continuously variable transmission (CVT) 26 arranged in a manner offset on one side of the engine main body 25, e.g., a right side of the engine main body 25 so as to overlap with the upper frames 4 in a plan view. The engine main body 25 is, for example, a water-cooled single-cylinder four-stroke-cycle engine, and includes a crankcase 27 and a cylinder assembly 31 composed of an aluminum alloy cylinder block 28, a cylinder head 29, and a magnesium alloy head cover 30 which are arranged so as to be inclined forward in front of an upper surface of the crankcase 27 at a relatively large angle.

An engine intake system 32 is arranged in a space surrounded by an upper portion of the cylinder assembly 31, a front portion of the rider's seat 12, and a rear portion of the steering shaft 18. The engine intake system 32 includes a throttle body 34 connected to a rear side of the cylinder head 29 through an intake passage 33, and an air cleaner 36 arranged above the throttle body 34 and in front of the rider's seat 12 and connected to an upstream side of the throttle body 34 through an intake pipe 35. The air cleaner 36 is arranged so as to protrude upward from an upper side of each upper frame 4.

An engine exhaust system 37 is arranged on one side of the engine main body 25, i.e., in this embodiment, on a right side thereof. The engine exhaust system 37 is composed of an exhaust pipe 38 connected to a front side of the cylinder head 29 and an exhaust muffler device 39 connected to a downstream end of the exhaust pipe 38.

The exhaust pipe 38 is arranged so as to extend downward in an obliquely forward direction of the cylinder head 29 to form a starting side end. The exhaust pipe 38 then extends gradually upward in an obliquely rearward direction thereof while being bent into a U-shape so as to detour the cylinder assembly 31, to be bent toward a side on which the belt continuously variable transmission 26 is arranged, i.e., toward right rearward. The exhaust pipe 38 further extends generally horizontally in a rearward direction along the upper frames 4 and the lower frames 5 of the vehicle body frame 3 between the upper frames 4 and the lower frames 5 above the belt continuously variable transmission 26 provided in the right portion of the engine unit 17.

In addition, the engine pipe 38 is offset from insides to outsides of the upper frames 4 near a portion above and in rear of the belt continuously variable transmission 26.

The exhaust pipe 38 and the exhaust muffler device 39 disposed on the rear side of the crankcase 27 extend longitudinally to one side of the vehicle 1 in the width direction, i.e., in this embodiment, below the outside of the right upper frame 4 substantially horizontally and parallel to the upper frames 4. In a side view, for example, the exhaust pipe 38 and the exhaust muffler device 39 are arranged above the rear wheels 16 and the rear suspension mechanism 15 with a distance therefrom and below the rear cover 22.

A front wheel driving propeller shaft 40 extends forward from a front portion of the crankcase 27, which constitutes the engine main body 25, generally on a center line 41 of the vehicle 1 substantially horizontally to the center line 41. A front end of the propeller shaft 40 is coupled to a front final reduction gear 42 arranged between the left and right lower frames 5 in rear of the vertical frame portions 4a of the upper frames 4.

Further, a pair of left and right front wheel axles 43 extend from this front final reduction gear 42 toward the left and right front wheels 14 so as to be coupled to the left and right front wheels 14, respectively. The left and right front wheels 14 are elastically supported by the vehicle body frame 3 by means of a pair of left and right front cushion units 44, which constitute the front suspension mechanism.

On the other hand, a rear wheel driving propeller shaft 45 extends backward from a rear portion of the crankcase 27 generally on the center line 41 of the vehicle 1 substantially horizontally to the center line 41. A rear end of the propeller shaft 45 is coupled to a reduction gear 46 serving as a gear reduction member of a drive system in the final reduction stage for the rear wheels 16 and arranged between the left and right lower frames 5 in front of the rear vertical frames 6. In this meaning, this reduction gear 46 may be called, hereinlater, rear final reduction gear 46.

Further, a pair of left and right rear wheel axles 47 extend from this rear final reduction gear 46 toward the left and right rear wheels 16 so as to be coupled to the left and right rear wheels 16, respectively. The left and right rear wheels 16 are elastically supported by the vehicle body frame 3 by means of a pair of left and right rear cushion units 48, which constitute the rear suspension mechanism 15.

A radiator 49 serving as a heat exchanger for cooling the engine main body 25 is arranged near a top portion of the vehicle body frame 3 in front of the steering shaft 18. A cooling fan 50 for the radiator 49 is also disposed on a rear surface of the radiator 49.

The belt (belt-type) continuously variable transmission 26 includes a transmission cooling system 51 for cooling the belt continuously variable transmission 26 by forcibly freshening air in a belt case 52 in which the belt continuously variable transmission 26 is accommodated.

The transmission cooling system 51 includes, as main constituent members, a water proof structure 53, an intake duct 54 and an exhaust duct 55.

The water proof structure 53 separates liquid and air of the external air introduced from the outside from each other. The intake duct 54, which connects the water proof structure 53 to an intake port 56 formed in a front portion of the belt case 52, introduces cooling air into the belt case 52. In a plan view, the intake duct 54 is arranged so as to substantially overlap with the upper frames 4. The exhaust duct 55 is connected to an exhaust port 57, which is formed in a rear portion of the belt case 52 and leads out exhaust air which has cooled the belt continuously variable transmission 26.

Figure 4:
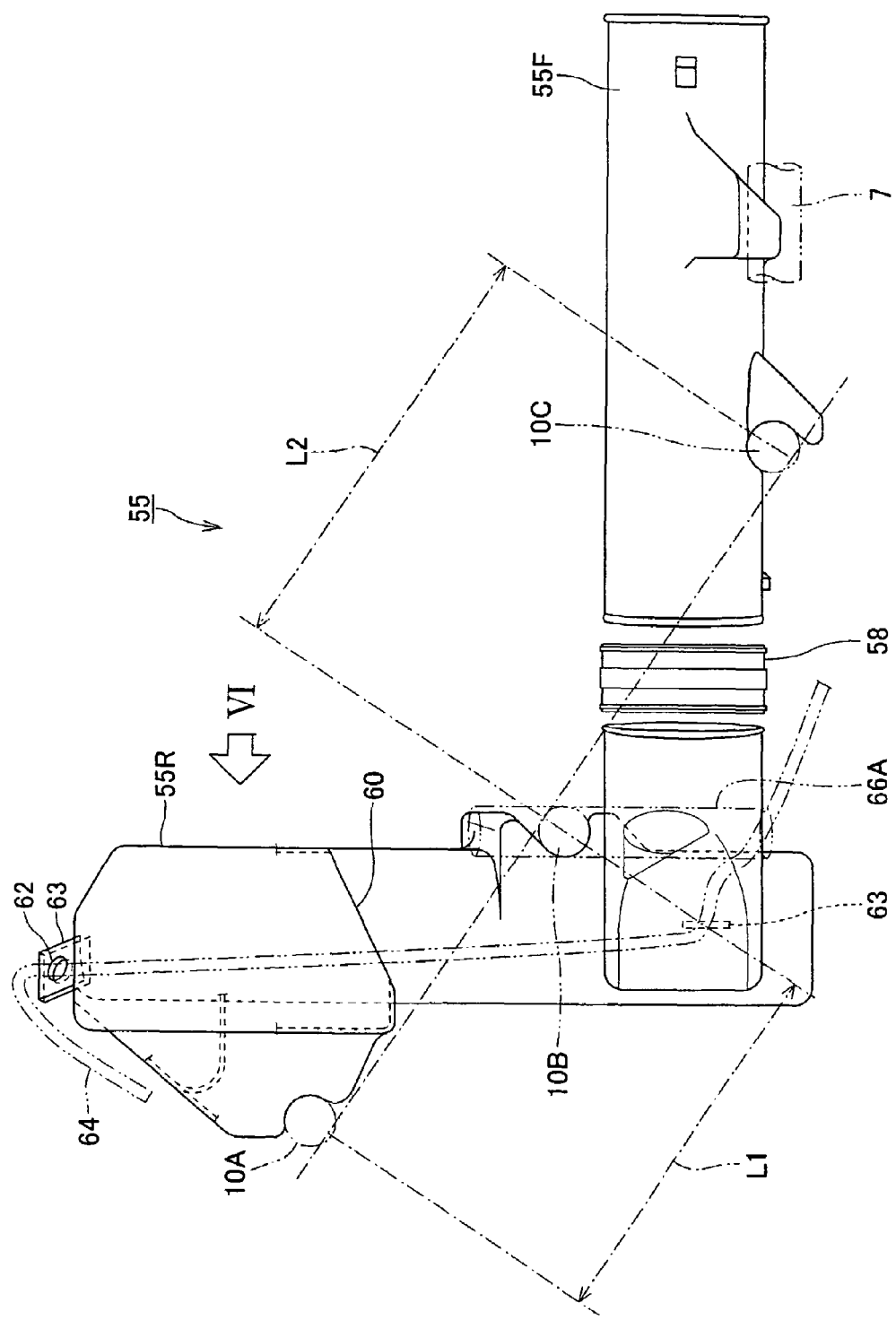
FIG. 4 is an enlarged right side view of an exhaust duct of the ATV.
Figure 5:
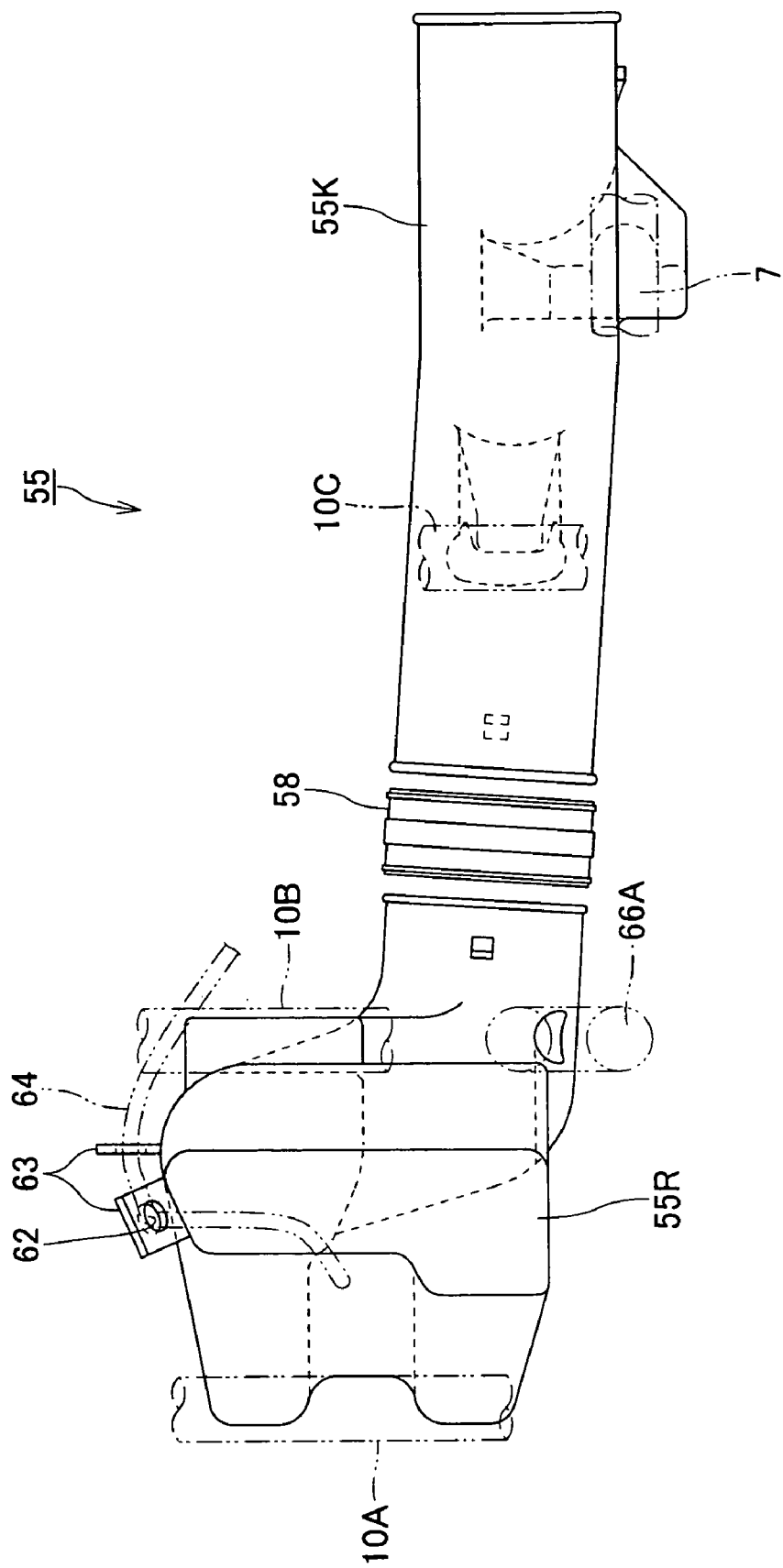
FIG. 5 is a plan view of the exhaust duct.
Figure 6:
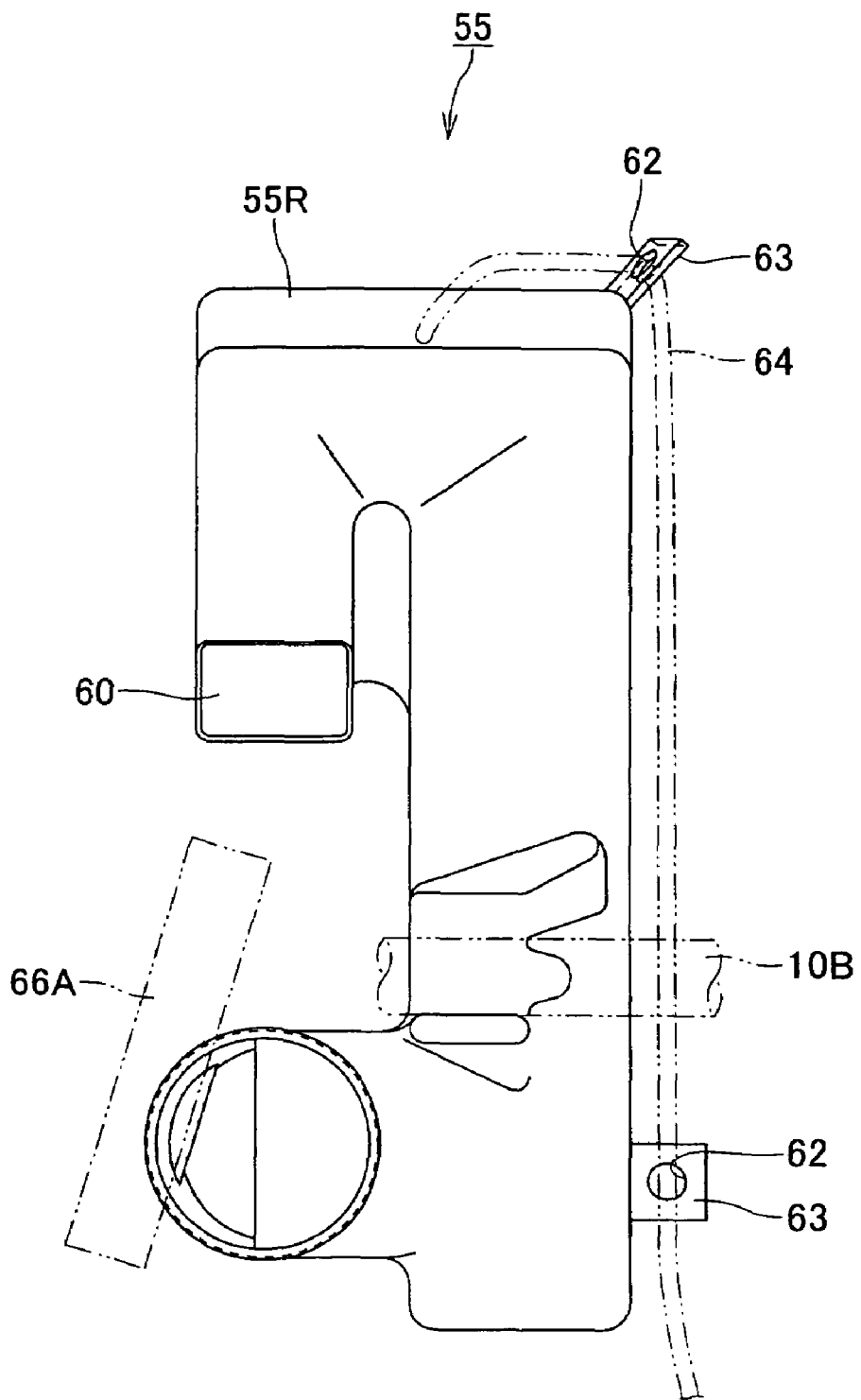
FIG. 6 shows the exhaust duct viewed from an arrow VI in FIG. 4.

FIGS. 4 to 6 show the exhaust duct 55 in an enlarged scale.

With reference to FIGS. 4 to 6, the exhaust duct 55 is formed of, for example, a synthetic resin material excellent in self-shape-keeping property and relatively high in rigidity and is composed of a plurality of constituent members. That is, as shown in FIGS. 1 to 6, the exhaust duct 55 is composed of a front portion 55F extending substantially in a horizontal direction and a rear portion 55R extending substantially in a vertical direction. The front portion 55F and the rear portion 55R are detachably coupled to each other through a coupling member 58 serving as another constituent member of the exhaust duct 55 and being formed of an elastic material having excellent flexibility and reversion property and also having air and liquid tightness in an exhaust direction of the exhaust air flowing in the exhaust duct 55.

The front portion 55F and the rear portion 55R of the exhaust duct 55 are bent to be formed into a generally L-shape in a side view by causing the front part 55F and the rear part 55R to intersect each other in an axial direction of the exhaust duct 55.

The exhaust duct 55 is led out from the rear portion of the belt continuously variable transmission 26 in a rear-upward direction so as to extend rearward. More specifically, in the side view, the exhaust duct 55 is arranged so that the front portion 55F is disposed on the rear side of the engine unit 17 to be substantially parallel to the rear transverse frames 7 constituting the vehicle body frame 3 and so that an upstream side of the front part 55F is connected to the exhaust port 57 formed at the rear portion of the belt case 52 through a connection duct 59 shaped generally downturn in a side view.

The connection duct 59 may be formed of either one of a rigid material or an elastic material. An upper end of the rear portion 55R of the exhaust duct 55 extending upward substantially perpendicularly near and above the right rear wheel axles 47 extends temporarily in a direction of the right side of the vehicle body 3 and then change the direction substantially perpendicularly so as to turn downward by as much as a small length.

A cooling air exhaust port 60 is formed on the lowest downstream end of the rear portion 55R. The cooling air exhaust port 60 as well as a cooling air intake port 61 of the water proof structure 53 provided at an upstream end of the intake duct 54 is arranged upward of the exhaust pipe 38 and the exhaust muffler device 39.

Guide plates 63 each having a guide hole 62 are formed integrally with the rear portion 55R of the exhaust duct 55 on, for example, a side surface of the rear portion 55R at, for example, upper and lower two positions, respectively. These guide plates 63 support a breather hose 64 extending from the rear final reduction gear 46. The breather hose 64 is positioned by being inserted into the guide holes 62.

Furthermore, in a plan view, the exhaust duct 55 is configured so as to extend rearward from the rear portion of the continuously variable transmission 26 arranged in a manner offset to one side of the engine main body 25, i.e., in this embodiment, a right side thereof, to the same side, i.e., the right side in this embodiment, so as to further extend to be slightly offset inwardly and to extend upward while passing through a center of the vehicle 1 near the rear end of the vehicle 1.

The exhaust duct 55 is detachably supported by the vehicle body frame 3.

A fuel tank 65 is arranged at a position below the rider's seat 12 in a plan view in a range from a rear end of the crankcase 27 to the neighborhood of a front portion of the rear final reduction gear 46 on the side opposite to the engine exhaust system 37 and the transmission cooling system 51 across the center line 47 of the vehicle 1.

In addition, the fuel tank 65 is provided to be inclined forward so that a front end thereof is located below a rear end thereof and a front lower portion thereof overlaps with the rear portion of the crankcase 52 in a side view.

Furthermore, one side surface of the fuel tank 65, i.e., in this embodiment, a left side surface thereof extends longitudinally and protrudes from the outside of the vehicle body frame 3 toward an inside of the left rear wheel 16 along a left external shape of the rider's seat 12 in the width direction.

The other side surface of the fuel tank 65, i.e., in this embodiment, a right side surface, strides over the rear wheel driving propeller shaft 45 so as to extend over the side opposite to the vehicle 1 in the width direction and is located, above the exhaust duct 55, at a position at which the other or right side surface overlaps with the front portion of the exhaust duct 55.

Moreover, a vertical height, i.e., a depth of the fuel tank 65 is set so that an upper surface of the fuel tank 65 is located substantially above the exhaust duct 55 and a bottom thereof is located substantially below the exhaust duct 55.

The front portion 55F of the exhaust duct 55, particularly a first half of the front portion 55 thereof is stored in a space formed between an inside surface to the bottom of the fuel tank 65 and a constituent member of the vehicle body frame 3 disposed so as to face these surfaces and provided within this space so as to be along these surfaces.

The coupling member 58 coupling the front portion 55F to the rear portion 55R of the exhaust duct 55 is arranged with a distance from this first half of the front part 55F so as not to extend along these surfaces.

Meanwhile, the rear portion of the vehicle body frame 3 forms a closed trapezoidal framework by the lower frames 5, the rear vertical frames 6, and the paired left and right rear transverse frames 7 connecting the generally central portions of the rear vertical frames 6 to those of the lower frames 5 so as to form a storage space for storing the rear suspension mechanism 15, the rear final reduction gear 46, etc. in a lower portion of the rear portion thereof.

In addition, a plurality of vertical frame members 66A to 66C connecting an upper portion of the trapezoidal framework to the upper frames 4 are arranged in parallel in the longitudinal direction. Thus, the structure in which a load applied from the vertical direction is shared among the vertical frame members 66A to 66C is provided.

The left and right integral frame members 2 constituting the vehicle body frame 3 are connected to each other in the width direction of the vehicle 1 by the plural cross members 10 arranged in parallel, as already described. Among these cross members 10, the three cross members 10A to 10C positioned in the rear portion of the vehicle body frame 3 are arranged in parallel so that the members 10A to 10C are located gradually upward toward the rear side of the vehicle body. That is, in this embodiment, these three cross members 10A to 10C are substantially flush with one another at an acute angle in the side view. The exhaust duct 55 is arranged so as to extend in a meandering manner between these cross members 10A to 10C, to which the bent portion of the exhaust duct 55 is arranged proximately, and detachably engaged with the cross members 10A to 10C with the self-shape of the exhaust duct 55 is kept unchanged, thus surely positioning the exhaust duct 55.

The exhaust pipe 38 is arranged to be offset from the inside to the outside of the vehicle body below the upper frames 4 utilizing a length of the belt continuously variable transmission 26. Thus, the exhaust pipe 38 and the exhaust muffler device 39 are disposed to be substantially flush with the intake duct 54 and the exhaust duct 55 connected to the belt case 52 of the belt continuously variable transmission 26.

On the other hand, as mentioned above, the rear final reduction gear 46 is arranged in the space formed within the closed trapezoidal framework and fixed to the vehicle frame 3.

In addition, the rear final reduction gear 46 is arranged on the center line 41 of the vehicle 1 in the plan view similarly to the rear wheel driving propeller shaft 45 extending rearward from the rear portion of the crankcase 27 generally on the center line 41 of the vehicle 1.

The exhaust duct 55 is arranged in the space located above the rear final reduction gear 46, offset outward in the width direction of the vehicle body frame 3 within a width of the vehicle body frame 3, and offset rearward in the longitudinal direction of the vehicle body frame 3 within the width of the vehicle body frame 3.

Further, the exhaust duct 55 is arranged to be proximate to the respective constituent members of the vehicle body frame 3 which form this space and which extend vertically, laterally, and longitudinally. The coupled portion is arranged so as to face a space surrounded by the exhaust muffler device 39, a portion above the rear final reduction gear 46 and the rear wheels 16, and a portion in front of the rear cushion unit 48.

The rear suspension mechanism, i.e., rear wheel suspension device, 15 is arranged by utilizing the trapezoidal framework as mentioned above. This rear suspension mechanism 15 is structured so that upper arms of, for example, a double-wishbone suspension mechanism are replaced by I-type arms, respectively. More specifically, the rear suspension mechanism 15 is an unequal-length link mechanism formed by combining I-type upper arms 68 with A-type lower arms 67 (wishbones).

Base ends of the lower arms 67 are rotatably pivoted to the lower frames 5 which is a lower bottom of the trapezoidal framework in a vertical direction. Free ends thereof extend outward in the width direction of the vehicle 1. Lower ends of the rear cushion units 48 are supported by the respective lower arms 67, and upper ends thereof are supported by the respective rear transverse frames 7 which form an upper bottom portion of the trapezoidal framework.

At positions at which the upper ends of the rear cushion units 48 are supported, the vertical frame members 66 connecting the upper portion of the upper bottom portion of the trapezoidal framework to the upper frames 4 are provided and configured to be suitable for receiving the load applied from the vertical direction.

The rear cushion units 48 are arranged to overlap with the portions above rear parts of the A-type lower arms 67, respectively. In addition, the I-type upper arms 68 are arranged so as to face the respective A-type lower arms 67 above the front portions of the A-type lower arms 67.

The rear suspension mechanism 15 is equipped with a stabilizer, which suppresses left and right suspensions from moving vertically at opposite phases and which is provided in the lower portion of the vehicle body frame 3.

The present invention of the described embodiment will operate or function in the following manner.

The fresh air (external air) is introduced as the cooling air into the belt case 52 in which the belt continuously variable transmission 26 is accommodated through the intake duct 54. The exhaust duct 55 that discharges the exhaust air, which has cooled the respective members in the bet case 52, into the air is arranged so as to extend rearward from the rear portion of the belt continuously variable transmission 26 and so as to be detachably supported by the vehicle body frame 3.

It is therefore possible to supply the exhaust air discharged from the cooling air exhaust port 60 of the exhaust duct 55 to the surroundings of the exhaust muffler device 39. As a result, the hot air remaining around the exhaust muffler device 39 does not flow toward a passenger, thus preventing the comfort of a rider or passenger from being lost.

In addition, it is also possible to prevent the synthetic resin compacts such as the rear fender 23 arranged around the exhaust muffler device 39 from being thermally deformed.

These advantages are particularly effective in a state that the external temperature is high or the vehicle 1 moves at low speed and a state that it is not expected for the running air to effectively cool the exhaust muffler device 39.

Furthermore, the exhaust duct 55 is configured by a plurality of constituent members, i.e., in this embodiment, the front part 55F and the rear part 55R thereof connected to each other along the exhaust direction of the exhaust air flowing inside. The front portion 55F and the rear portion 55R distanced from each other are formed from the high rigid material capable of holding their own shapes and are detachably connected to each other through the coupling member 58 serving as another constituent member formed from the elastic material. It is therefore possible to facilitate the assembling of the exhaust duct 55 even from a narrow gap of the vehicle body frame 3 formed in a complicated combination and also possible to improve the performance for assembling the exhaust duct 55 into the vehicle body.

A plurality of cross members 10 connecting the left and right integral frame members 2 constituting the vehicle body frame 3 are provided in parallel to one another. The exhaust duct 55 is formed in the bent shape by causing the front portion 55F and the rear portion 55R to intersect each other in the axial direction of the exhaust duct.

In addition, the exhaust duct 55 is arranged in a meandering manner among the cross members 10A to 10C, to which the bent portion of the exhaust duct 55 is arranged proximately, and detachably engaged with the cross members 10A to 10C with the own shape of the exhaust duct 55 being maintained unchanged, thereby positioning the exhaust duct 55. This can make it unnecessary to firmly press both the front portion 55F and the rear portion 55R of the exhaust duct 55 while being detached from or attached to each other.

Moreover, since it becomes not necessary to perform the positioning of the exhaust duct 55 carefully, a user can hence concentrate the detachment or attachment working, thus improving the assembling performance.

Furthermore, the belt continuously variable transmission 26 is arranged in the manner offset to one side of the vehicle 1, i.e., right side, in the described embodiment. In addition, the exhaust duct 55 is arranged so as to extend to the same side as the belt continuously variable transmission 26. The fuel tank 65 is arranged, in the plan view, offset on the side opposite to the continuously variable transmission 26 and the exhaust duct 55 across the center line 41 of the vehicle. One side surface of the fuel tank 65, i.e., in this embodiment, the left side surface thereof, extends longitudinally and protrudes from the outside of the vehicle body frame 3 toward the inside of the left rear wheel 16 along the left external shape of the rider's sheet 12 in the width direction.

The other side surface of the fuel tank 65, i.e., right side surface, in this embodiment, strides over the rear wheel driving propeller shaft 45 so as to extend over the opposite side of the vehicle 1 in the width direction, and is located at a position at which the other or right side surface overlaps with the front portion of the exhaust duct 55 above the exhaust duct 55.

The front portion 55F of the exhaust duct 55 is located in the space formed between the inside surface to bottom portion of the fuel tank 65 and the constituent member of the vehicle body frame 3 disposed so as to face these surfaces therealong. The coupling member 58 coupling the front portion 55F and the rear portion 55F of the exhaust duct 55 to each other is arranged with a distance from the portion along these surfaces. It is therefore possible to compactly store the exhaust duct 55 in the space formed between the fuel tank 65 and the vehicle body frame 3.

The connecting position between the front portion 55F and the rear portion 55R of the exhaust duct 55 can be provided apart from the narrow space between the fuel tank 65 and the vehicle body frame 3, thus being advantageous for the working space. The arrangement of the exhaust duct 55 in the narrow space can be easily performed because of the own shape of the exhaust duct 55. Moreover, the capacity of the fuel tank 65 can be sufficiently secured.

In addition, by setting, to be large, the length of the coupling member 58 coupling the front portion 55F to the rear portion 55R, even if the length of the coupling member 58 is small, it is possible to mount the front and rear portions 55F and 55R in the vehicle body frame 3 in the temporarily assembling state thereof or may be possible to couple the front and rear portions 55F and 55R after separately mounting them to the vehicle body frame 3.

The exhaust duct 55 is arranged in the space formed above the rear final reduction gear 46, offset outward in the width direction of the vehicle body frame 3 within the width of the vehicle body frame 3, and offset rearward in the longitudinal direction of the vehicle body frame 3 within the width of the vehicle body frame 3.

Furthermore, the exhaust duct 55 is arranged to be proximate to the respective constituent members of the vehicle body frame 3 which form the space and which extend in the vertical, width and longitudinal directions. The coupling member 58 is arranged in this space. It is therefore possible to compactly store the exhaust duct 55 in the space between the rear final reduction gear 46 serving as the drive system for the rear wheels 16 and the vehicle body frame 3.

On the other hand, the connecting position between the front and rear portions 55F and 55R of the exhaust duct 55 for which the operation space is necessary can be provided above the rear final reduction gear 46 surrounded by the vehicle body frame 3. In addition, since the relatively wide space is generated particularly above the paired left and right rear wheel axles 47, the coupling member 58 can be easily accessed. The arrangement of the exhaust duct 55 into the wide space can be easily performed because of the own shape of the exhaust duct 55. In addition, the capacity of the fuel tank 65 can be sufficiently secured.

Moreover, the exhaust muffler device 39 and the rear final reduction gear 46 are arranged outward of one side of the vehicle body frame 3 vertically with the distance from each other. The coupling portion between the front portion 55F and the rear portion 55R of the exhaust duct 55 led out from the rear portion of the belt continuously variable transmission 26 arranged in the central lower portion of the vehicle frame 3 toward rear-upward is arranged so as to face the space surrounded by the exhaust muffler device 39, the portion above the rear final reduction gear 46 and the rear wheels 16, and the portion in front of the rear cushion units 48.

The outside portion, in the width direction, of the detachment and attachment operation space for the exhaust duct 55 is specified to the inside surfaces of the rear wheels 16, and the connecting portion between the front portion 55F and the rear portion 55R is locally arranged at an upper portion surrounded by the engine exhaust system 37 and a lower or rear portion surrounded by the rear suspension mechanism 15 and the rear cushion units 48. This can facilitate the performing of the attachment and detachment operation for the exhaust duct 55.

The exhaust duct attachment and detachment operation space can be set below the engine exhaust system 37, having increased temperature, and the space occupied by the rear final reduction gear 46 can be used while avoiding the adjacent location of the exhaust duct attachment and detachment operation space to the engine exhaust system 37. It is possible to not only secure the wide operation space but also arrange the exhaust duct 55 compactly. In addition, the exhaust duct 55 is attached into the vehicle body frame 3 having supporting rigidity, thus ensuring the sufficiently high attachment rigidity.

The coupling portion between the front and rear portions 55F and 55R of the exhaust duct 55 is arranged in front of the rear cushion units 48. This can facilitate access to the coupling portion from the lateral side. In addition, since the longitudinal position is equivalent to or forward of the rear wheel axels 47, it is difficult to apply foreign matters such as sands, pebbles, water, or mud splashed or flung up by the rear wheels 16 to a fastening member or a fitting seal portion of the coupling member. Moreover, the coupling portion is made difficult to view from behind, thereby improving the outer appearance.

The upper end of the rear portion 55R of the exhaust duct is arranged to be temporarily bent to the right side of the vehicle body, to be bent substantially perpendicularly to turn downward, and to thereby form the cooling air exhaust port 60 on the lowest downstream end of the rear part 55R. According to the arrangement of the exhaust duct 55 thus configured as well as the water proof structure 53 provided on the upstream end of the intake duct 54, it is possible to prevent mud, water or the like from entering the belt case 52 accommodating therein the belt continuously variable transmission 26, thus being advantageous.

The exhaust pipe 38 and the exhaust muffler device 39 are provided to be substantially flush with the intake duct 54 and the exhaust duct 55 connected to the belt case 52 of the belt continuously variable transmission 26 to thereby provide the compact arrangement of these members, and it is unnecessary to arrange the exhaust duct 55 in the meandering manner as in the conventional arrangement. It is, therefore, possible to prevent making the entire length of the exhaust duct 55 unnecessarily large.

In addition, since the exhaust pipe 38 is led out from the inside to the outside of the vehicle body frame 3 near the portion above the continuously variable transmission 26, it becomes possible to make the detour structure for the exhaust duct 55 small and to arrange the exhaust muffler device 39 and the exhaust duct 55 to be proximate to each other, that is, make the cooling target and the cooling means closer to each other. It is, therefore, possible to effectively cool the surroundings of the exhaust muffler device 39.

Furthermore, the guide plates 63 each having the guide hole 62 are formed integrally with the exhaust duct 55, and the breather hose 63 extending from the rear final reduction gear 46 is inserted into the guide holes 62 to position the breather hose 63. It is thereby possible to integrally attach the breather hose 63 and the exhaust duct 55 while the breather hose 64 being temporarily assembled into the exhaust duct 55. As a result, this assembling time and work can be shortened, the productivity on the assembling line can be improved, and the number of components can be reduced, thus being effective in workability and cost.

Further, it is to be noted that the present-invention is not limited to the described embodiment and many other changes and modifications may be made without departing from the scopes of the appended claims.

For example, although, in the embodiment described above, the rear final reduction gear 46 is employed as the drive system for the rear wheels 16 in the final reduction stage, in an alternation, a rear differential reduction gear (rear differential device) may be adopted in place of the drive system of the described embodiment.

What is claimed is:

1. A rear structure of an all terrain vehicle, the all terrain vehicle including:
 a vehicle body;
 a vehicle body frame having left and right frame members connected integrally to each other;
 an engine unit including a belt transmission on one side thereof and mounted to a central lower portion of the vehicle body frame;

an inlet duct for introducing a cooling air, the inlet duct forcibly freshening an air within a belt case in which the belt transmission is accommodated so as to cool the belt transmission;

an exhaust duct for discharging an exhaust air which has cooled the belt transmission; and an exhaust muffler device disposed at a portion outward of one side of a rear portion of the vehicle body frame, wherein the belt transmission is arranged in a manner offset on a same side as the exhaust muffler device in a width direction, the exhaust duct extends rearward from a rear portion of the belt transmission so as to be disposed on the same side as the belt transmission and is detachably supported by the vehicle body frame, a fuel tank is arranged in a manner offset on a side opposite to the belt transmission and the exhaust duct with respect to a center line of the vehicle in a plan view, the exhaust duct is arranged in a space formed between an inside surface to a bottom portion of the fuel tank in the width direction of the vehicle body and the exhaust muffler device provided so as to face the inside surface of the fuel tank, and the exhaust duct is composed of a plurality of constituent members coupled to one another along an exhaust direction of the exhaust air flowing in the exhaust duct.

2. The rear structure of the all terrain vehicle according to claim 1, wherein the constituent members distanced from one another comprise a high rigidity material holding an own shape thereof, and the constituent members are detachably coupled to one another through a coupling member formed of an elastic material.

3. The rear structure of the all terrain vehicle according to claim 2, wherein the frame members are coupled by a plurality of cross members which are arranged in parallel to one another, the constituent members are formed in a bent shape by intersecting one another in an axial direction of the exhaust duct, and the bent portion is disposed relative to the cross members so that the exhaust duct is arranged in a meandering manner among the adjacent cross members, and the exhaust duct is detachably engaged with and positioned relative to the cross members while maintaining an own shape of the exhaust duct.

4. The rear structure of the all terrain vehicle according to claim 2, wherein the exhaust duct is arranged in a space above a rear wheel driving system arranged on the center line of the vehicle body in a plan view, and the exhaust duct is arranged to be proximate to the respective constituent members of the vehicle body frame which form the space, in which the coupling member is arranged.

5. The rear structure of the all terrain vehicle according to claim 4, wherein the exhaust muffler device and the rear wheel driving system are arranged with a distance vertically from each other, and a coupled portion of the exhaust duct extending rearward and upward from the rear portion of the belt transmission is arranged so as to face a space formed between the exhaust muffler device or the rear wheel driving system and a portion above rear wheels.

6. The rear structure of the all terrain vehicle according to claim 4, wherein a guide plate including a guide hole is formed integrally with the exhaust duct, and a breather hose extending from the rear wheel driving system is inserted into the guide hole to thereby position the breather hose.

7. The rear structure of the all terrain vehicle according to claim 2, wherein the coupling member coupling the constituent members of the exhaust duct to one another is arranged at a distance from a portion along the inside surface and the bottom portion of the fuel tank.

8. A rear structure of an all terrain vehicle, the all terrain vehicle including:

a vehicle body;

a vehicle body frame having left and right frame members connected integrally to each other;

an engine unit including a belt transmission on one side thereof and mounted to a central lower portion of the vehicle body frame;

an inlet duct for introducing a cooling air, the inlet duct forcibly freshening an air within a belt case in which the belt transmission is accommodated so as to cool the belt transmission;

an exhaust duct for discharging an exhaust air which has cooled the belt transmission; and an exhaust muffler device disposed at a portion outward of one side of a rear portion of the vehicle body frame, wherein the exhaust duct extends rearward from a rear portion of the belt transmission and is detachably supported by the vehicle body frame, the exhaust duct is composed of a plurality of constituent members coupled to one another along an exhaust direction of the exhaust air flowing in the exhaust duct, the constituent members distanced from one another are formed from a high rigidity material holding an own shape thereof, the constituent members are detachably coupled to one another through a coupling member formed of an elastic material, the exhaust duct is arranged in a space above a rear wheel driving system arranged on the center line of the vehicle body in a plan view, and the exhaust duct is arranged to be proximate to the respective constituent members of the vehicle body frame which form the space, in which the coupling member is arranged, and a guide plate including a guide hole is formed integrally with the exhaust duct, and a breather hose extending from the rear wheel driving system is inserted into the guide hole to thereby position the breather hose.

* * * * *